United States Patent [19]

Freeny, Jr.

[11] 4,209,787

[45] Jun. 24, 1980

[54] METHOD FOR MONITORING THE LOCATION OF MONITORED OBJECTS

[75] Inventor: Charles C. Freeny, Jr., Ft. Worth, Tex.

[73] Assignee: Gould Inc., Rolling Meadows, Ill.

[21] Appl. No.: 938,477

[22] Filed: Aug. 31, 1978

Related U.S. Application Data

[63] Continuation-in-part of Ser. No. 568,671, Apr. 16, 1975, Pat. No. 4,112,421.

[51] Int. Cl.² ............................................. G01S 3/02
[52] U.S. Cl. ............................. 343/112 R; 340/346; 364/449
[58] Field of Search .................. 343/112 R, 112 D; 325/4, 53, 54, 55, 67, 117, 158, 185, 186, 29; 340/22, 23, 24, 346

[56] References Cited

U.S. PATENT DOCUMENTS 3,644,883  2/1972  Borman et al. ...................... 340/23

Primary Examiner—Theodore M. Blum
Attorney, Agent, or Firm—Charles A. Codding; Charles E. Snee, III; Russell E. Baumann

[57] ABSTRACT

A method for monitoring the location of monitored objects within a monitored area wherein signpost units are positioned at the intersections of first and second coordinate grid lines and each signpost unit transmits a signpost code comprising a first portion corresponding to the first coordinate grid line and a second portion corresponding to the second coordinate grid line. The first coordinate grid lines are assigned numbers sequentially increasing in a first direction and the second coordinate grid lines are assigned numbers sequentially increasing in a second direction. The signpost unit output signals encoded with the signpost codes are received via vehicle units located in the monitored objects and the unique signpost codes are utilized to determine the location of the monitored object relative to one of the signpost units including the direction of the monitored object from the signpost unit.

11 Claims, 3 Drawing Figures

METHOD FOR MONITORING THE LOCATION OF MONITORED OBJECTS

CROSS-REFERENCE TO RELATED APPLICATION

This application is a continuation-in-part of the applicant's co-pending U.S. patent application, Ser. No. 568,671, entitled "METHOD AND APPARATUS FOR AUTOMATICALLY MONITORING OBJECTS", filed Apr. 16, 1975, now U.S. Pat. No. 4,112,421, which is assigned to the assignee of the present application.

BRIEF DESCRIPTION OF THE PREFERRED EMBODIMENT

Figures 1, 2:
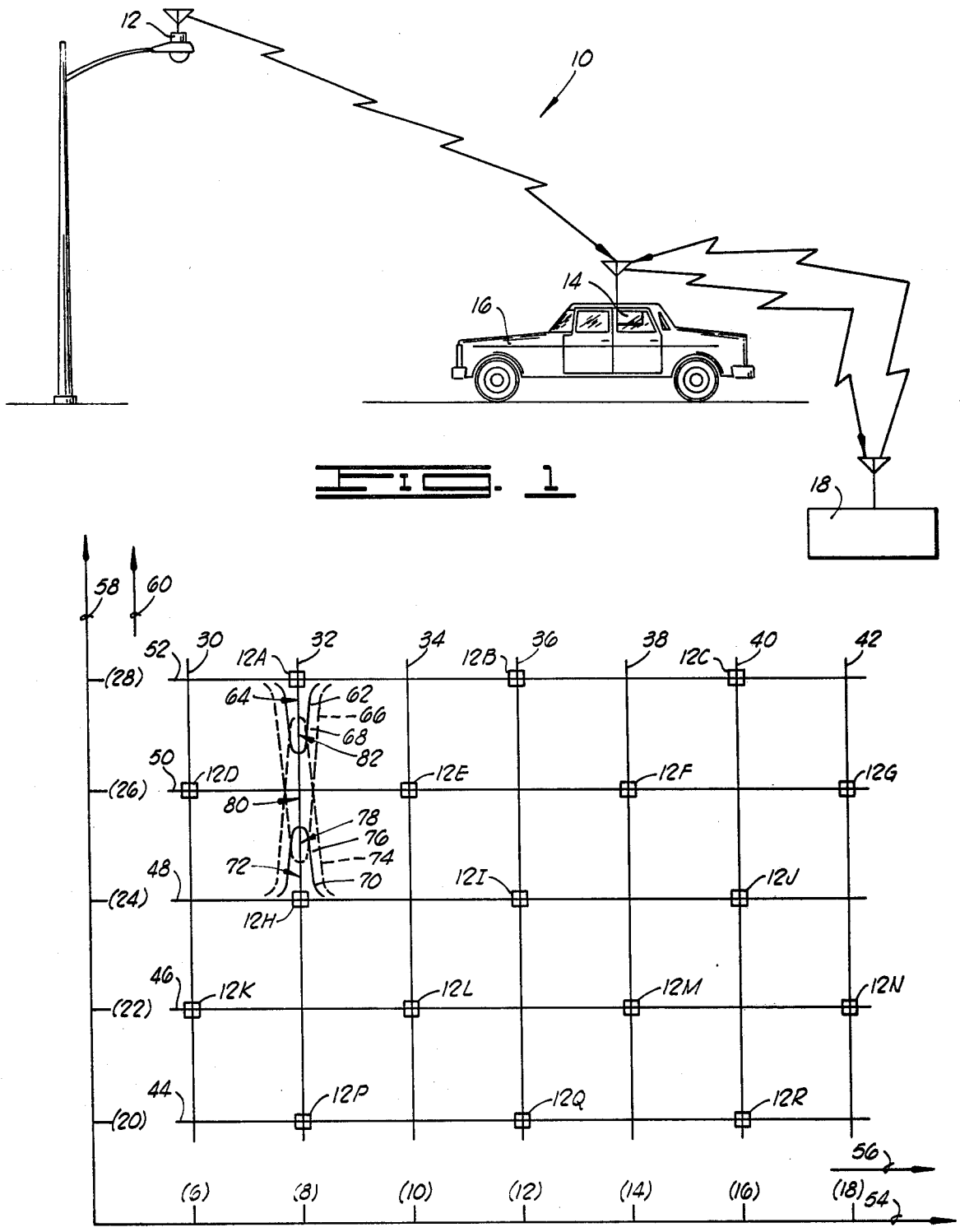
FIG. 1 is a diagrammatic view showing the object monitoring system of the present invention.
FIG. 2 is a diagrammatic view illustrating the signpost unit positioning and coding.

The object or vehicle monitoring system is generally shown in FIG. 1 and designated by the reference numeral 10 and, in general, includes: a plurality of signpost units 12 (only one signpost unit 12 being shown in FIG. 1) positioned within a monitored area in accordance with a predetermined signpost configuration; a plurality of vehicle units 14 (only one vehicle unit 14 being shown in FIG. 1), each vehicle unit 14 being located in a monitored object or vehicle 16; and a base station 18. Each signpost unit 12 is encoded with a predetermined binary signpost code which uniquely identifies the location of the signpost unit 12 and each signpost unit 12 transmits an output signal encoded with the signpost code. The signpost code 12 output signals encoded with the signpost codes are received via the vehicle units 14 and utilized to generate a vehicle location code which identifies a particular vehicle unit 14 or vehicle 16 and the location of the particular vehicle 16 within the monitored area, the vehicle location codes being transmitted via the vehicle units 14 to the base station 18. The construction and operation of signpost units of the type generally described above including vehicle units and a cooperating base station have been described in the co-pending application entitled "METHOD AND APPARATUS FOR AUTOMATICALLY MONITORING OBJECTS", filed Apr. 16, 1975, Ser. No. 568,671, referred to before, and such descriptions are incorporated herein by reference.

Each signpost unit 12 is positioned within the monitored area at the intersection of a first coordinate grid line 30, 32, 34, 36, 38, 40 or 42 and a second coordinate grid line 44, 46, 48, 50 or 52, as shown in FIG. 2. The coordinate grid system shown in FIG. 2 comprises a first base line 54 extending in a first direction 56 and a second base line 58 extending in a second direction 60. The first grid lines 30-42 extend generally in the second direction 60 and are spaced generally in the first direction 56. The second grid lines 44-52 extend generally in the first direction 56 and are spaced in the second direction 58. Binary numbers are assigned to the first grid lines 30-42 sequentially increasing in the first direction 56. Binary numbers are assigned to the second grid lines 44-52 sequentially increasing in the second direction 60. For purposes of illustration, the first grid lines 30-42 have been assigned binary numbers corresponding to the numerals "6", "8", "10", "12", "14", "16", and "18", respectively, and the second grid lines 44-52 have been assigned binary numbers corresponding to the numerals "20", "22", "24", "26", and "28", respectively, the numbers assigned to the grid lines 30-52 being shown adjacent the base lines 54 and 58 in FIG. 2 in parenthesis and in the decimal counting system, for clarity.

The grid lines 30-52 pass through the monitored area and, for purposes of illustration, it will be considered that the roadways and, accordingly, the grid lines 30-52 are spaced and oriented with respect to the cardinal directions such that the resulting grid system is orthogonal. In an operating system, the first direction 56 could correspond to an easterly direction and that the second direction 60 could correspond to a northerly direction, for example. It will be apparent to those skilled in the art that the grid system need not be orthogonal nor need the grid system be oriented in any particular manner with respect to the cardinal directions.

The signpost units 12 are positioned at selected intersections of one of the first grid lines 30-42 with one of the second grid lines 44-52, signpost units 12A, 12B, 12C, 12D, 12E, 12F, 12G, 12H, 12I, 12J, 12K, 12L, 12M, 12N, 12P, 12Q and 12R being shown in FIG. 2 positioned at predetermined intersections. Each signpost unit 12 is encoded with a 2N-digit binary signpost code uniquely identifying the particular signpost unit 12, having a first portion comprising an N-digit binary number corresponding to the number assigned to the first coordinate grid line and a second portion comprising an N-digit binary number corresponding to the number assigned to the second coordinate grid line of the intersecting first and second coordinate grid lines defining the location or position of the particular signpost unit 12. Thus, with respect to the signpost units 12 shown in FIG. 2, each of the signpost units is encoded with the binary signpost code as shown in TABLE I below:

TABLE I

| Signpost Unit | Signpost Code First Portion | Signpost Code Second Portion |
| --- | --- | --- |
| 12A | 8 | 28 |
| 12B | 12 | 28 |
| 12C | 16 | 28 |
| 12D | 6 | 26 |
| 12E | 10 | 26 |
| 12F | 14 | 26 |
| 12G | 18 | 26 |
| 12H | 8 | 24 |
| 12I | 12 | 24 |
| 12J | 16 | 24 |
| 12K | 6 | 22 |
| 12L | 10 | 22 |
| 12M | 14 | 22 |
| 12N | 18 | 22 |
| 12P | 8 | 20 |
| 12Q | 12 | 20 |
| 12R | 16 | 20 |

The power level or intensity of a signpost unit 12 output signal encoded with the signpost code emitted or transmitted via each of the signpost units 12 will decrease with increasing distance from the particular signpost unit 12. Further, the radiation field produced by the signpost unit 12 output signals will be modified by surrounding structures such as buildings, power lines and the like. It has been found that the radiation fields tend to be channeled along roadways particularly in monitored areas with many surrounding buildings.

As described in my co-pending application mentioned before, each signpost unit 12 output signal establishes a near-field region extending a distance from the signpost unit 12 wherein the power level of the signpost unit 12 output signal is at least equal to a predetermined power level ($P_1$) and a far-field region extending a distance from the signpost unit 12, greater than the distance the near-field region extends from the signpost unit 12, wherein the power level of the signpost unit 12 output signal is at least equal to a predetermined power level ($P_2$), the power level ($P_1$) being greater than the power level ($P_2$). The radiation fields produced along a segment of first grid line 32 by signpost units 12A and 12H have been schematically illustrated in contour map form in FIG. 2 for a situation in which channeling of the fields occurs. The contour 62 defining a near-field region 64 illustrates the locus of points for which the strength of the output signal emitted from the signpost 12A has a power level at least equal to the power level ($P_1$); the contour 66 defining a far-field region 68 illustrates the locus of points for which the strength of the output signal emitted from signpost unit 12A has a power level at least equal to the power level ($P_2$); the contour 70 defining the near-field region 72 illustrates the locus of points for which the strength of the output signal emitted from signpost unit 12H has a power level at least equal to the power level ($P_1$); and contour 74 defining the far-field region 76 illustrates the locus of points for which the strength of the output signal emitted from signpost unit 12H has a power level at least equal to the power level ($P_2$).

Each signpost unit 12 is positioned within the monitored area such that a portion of the far-field region of each signpost unit 12 overlaps a portion of a near-field region of at least one other signpost unit 12 thereby forming a transition region and such that a portion of the far-field region of each signpost unit 12 overlaps a portion of the far-field region of at least one other signpost unit 12 thereby forming an overlap region. With respect to the signpost units 12A and 12H, the far-field region of the signpost unit 12A overlaps a portion of the near-field region of the signpost unit 12H thereby forming the transition region 78; the far-field region of the signpost unit 12A overlaps a portion of the far-field region of the signpost unit 12H thereby forming an overlap region 80; and a portion of the far-field region of the signpost unit 12H overlaps a portion of the near-field region of the signpost unit 12A thereby forming a transition region 82.

Thus, with respect to the signpost units 12A and 12H, five identifiable regions are established or formed via the output signals emitted or transmitted from the signpost units 12A and 12H; the near-field region 72 wherein the vehicle unit 14 receives the signpost code (8, 24) transmitted via the signpost unit 12H at a power level at least equal to the power level ($P_1$); the transition region 78 wherein the vehicle unit 14 receives the signpost code (8, 24) transmitted via the signpost unit 12H at a power level at least equal to the power level ($P_1$) and the signpost code (8, 28) transmitted via the signpost unit 12A at a power level at least equal to the power level ($P_2$) but less than the power level ($P_1$); the overlap region 80 wherein the vehicle unit 14 receives the signpost code (8, 24) transmitted via the signpost unit 12H at a power level at least equal to the power level ($P_2$) but less than the power level ($P_1$) and the signpost code (8, 28) transmitted via the signpost unit 12A at a power level at least equal to the power level ($P_2$) but less than the power level ($P_1$); the transition region 82 wherein the vehicle unit 14 receives the signpost code (8, 28) transmitted via the signpost unit 12A at a power level at least equal to the power level ($P_1$) and the signpost code (8, 24) transmitted via the signpost unit 12H at a power level at least equal to the power level ($P_2$) but less than the power level ($P_1$); and the near-field region 64 wherein the vehicle unit 14 receives the signpost code (8, 28) transmitted via the signpost unit 12A at a power level at least equal to the power level ($P_1$).

In the transition regions and in the overlap regions, the vehicle unit 14 receives in an alternating manner the signpost codes transmitted via the signpost units 12 cooperating to form the particular transition region and the particular overlap region, as described in my co-pending application (referred to before) with respect to overlap regions. It will be apparent to those skilled in the art, that the signpost unit output signals could have more than two power level regions thereby increasing the number of identifiable regions which could be established by overlapping portions of the fields established via the signpost units 12.

Figure 3:
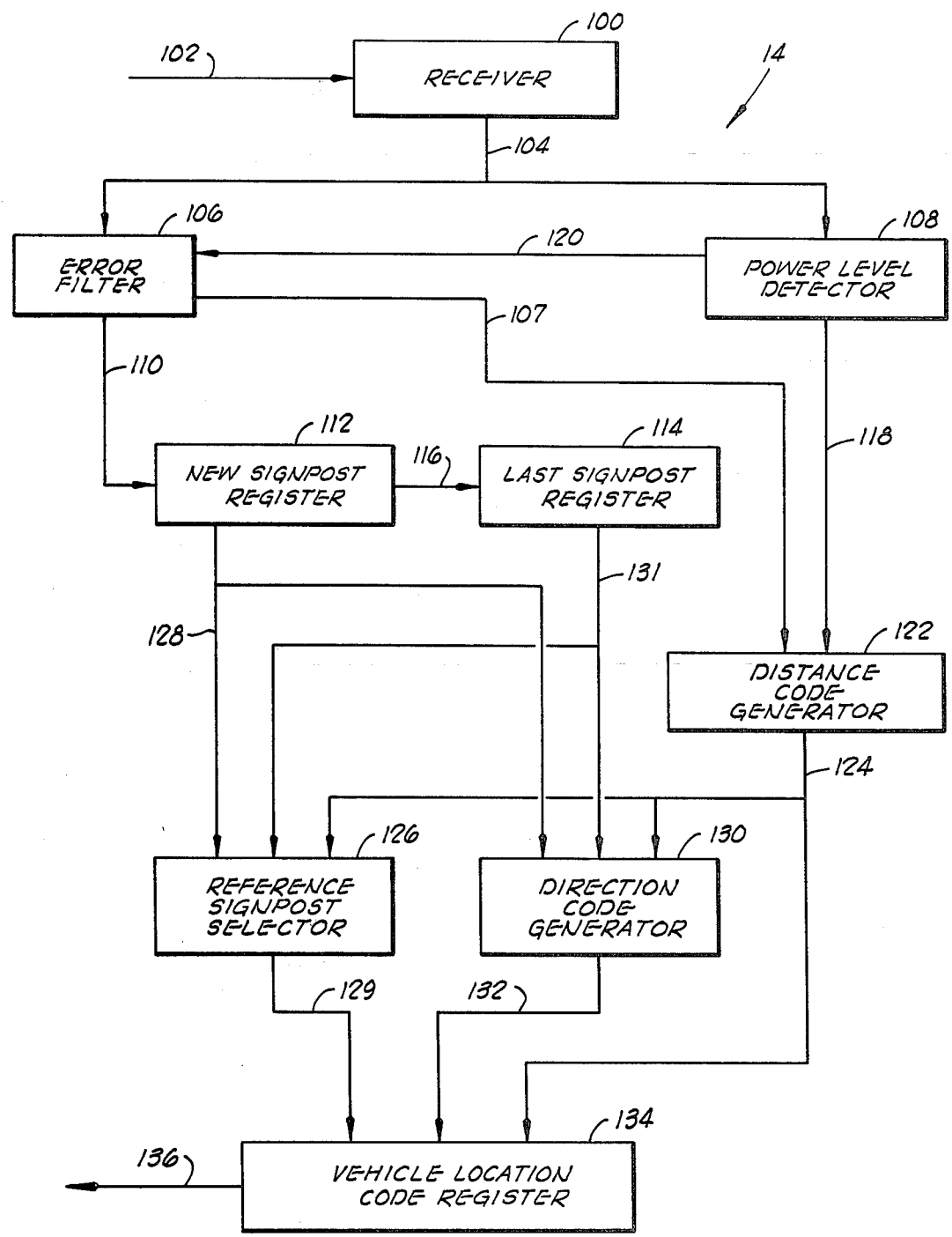
FIG. 3 is a schematic view of the vehicle unit.

As shown in FIG. 3, each vehicle unit includes a receiver 100 which receives the signpost unit 12 output signals via an input signal path 102 and provides the signpost code encoded in the received incoming signpost unit 12 output signals on output signal path 104. The signpost code provided on the output signal path 104 is received via an error filter 106 and a power level detector 108.

The error filter 106 decodes the signpost code received on the signal path 104 and provides an output valid data signal via a signal path 107. Further, in response to a determination via the error filter 106 that the received signpost code is a valid signpost code, the error filter provides the received signpost code on an output signal path 110.

Each valid signpost code received via the vehicle unit 14 is entered into a new signpost register 112, the new signpost register 112 receiving the signpost code on the signal path 110 from the error filter 106. When a new signpost code is entered into the new signpost register 112, the signpost code which was in the new signpost register 112 is shifted and entered into a last signpost register 114 via a signal path 116. Thus, each time the vehicle unit 14 receives a signpost code from a signpost unit 12, the received signpost code is entered into the new signpost register 112 and the previously received signpost code which was in the new signpost register 112 is entered into the last signpost register 114.

The signpost code in the new signpost register 112 is referred to herein as the "new signpost code" and the signpost code in the last signpost register 114 is referred to herein as the "last signpost code". The term "new signpost code" is used herein to refer to the signpost code which is being received via the vehicle unit 14 and the term "last signpost code" is used herein to refer to the signpost code which was received via the vehicle unit 14 immediately prior to receiving the "new signpost code".

The power level detector 108 detects the power level of the signpost unit 12 output signal received via the signpost unit 14 and provides an output signal on a signal path 118 indicative of the power level of the received signpost unit 12 output signal. More particularly, the power level detector 108 provides one output signal on the signal path 118 in response to a received signpost unit 12 output signal having a power level greater than or equal to (at least equal to) the power level ($P_1$) and another output signal in response to a received signpost unit 12 output signal having a power level less than the power level ($P_1$) and greater than or equal to (at least equal to) the power level ($P_2$). The power level output signals provided via the power level detector 108 are in a binary form.

The power level detector 108 also provides an output signal on a signal path 120 in response to a received signpost unit 12 output signal having a power level less than the power level ($P_2$). The output signal on the signal path 120 is received via the error filter 106 and the error filter 106 is disengaged or disenabled in response to receiving a power level detector 108 output signal on the signal path 120 indicating the received signpost unit 12 output signal has a power level less than the power level ($P_2$). In this condition, the error filter 106 will not provide the received signpost code on the signal path 110. Thus, the vehicle unit 14 is constructed to process only received signpost unit 12 output signals having a power level equal to or greater than the power level ($P_2$).

The power level detector 108 output signal on the signal path 118 is received via a distance code generator 122. The distance code generator 122 also receives the valid data signal from the error filter 106 on the signal path 107. The distance code generator 122 is constructed such that an output signal on the signal path 118 is entered into the distance code generator 122 only in response to a received valid data signal from the error filter 106 indicating that the received signpost code is a valid signpost code.

The distance code generator 122 stores the power level detector 108 output signal indicating the power level of each received signpost code and the previously received signpost code. In other words, the distance code generator 122 is constructed to store the power level of each new signpost code and each last signpost code and to generate a distance code in response to the power levels of the signpost unit 12 output signals corresponding to the new signpost code and the last signpost code. The distance code is provided via the distance code generator 122 on an output signal path 124 and is provided in a binary form, in a preferred embodiment.

For example, if the power levels of the signpost unit 12 output signals corresponding to the new and the last signpost codes are each at least equal to the power level ($P_1$), the distance code identifies the vehicle or vehicle unit 14 as being located in a near-field region. If the power levels of the signpost unit 12 output signals corresponding to the new and the last signpost codes are each at least equal to the power level ($P_2$) but less than the power level ($P_1$), the distance code identifies the vehicle or vehicle unit 14 as being located in an overlap region. If the power levels of the signpost unit 12 output signals corresponding to the new and the last signpost codes are different with one being at least equal to the power level ($P_1$) and the other being at least equal to the power level ($P_2$) but less than the power level ($P_1$), the distance code identifies the vehicle or vehicle unit 14 as being located in a transition region.

The signpost unit 14 includes a reference signpost selector 126. The reference selector 126 receives the new signpost code stored in the new signpost register 112 via a signal path 128, receives the last signpost code stored in the last signpost register 114 via a signal path 131 and receives the distance code from the distance code generator 122 on the signal path 124. In response to receiving the new signpost code, the last signpost code and the distance code, the reference signpost selector 126 selects one of the new signpost code and the last signpost code as a reference signpost code and the reference signpost code is provided via the reference signpost selector 126 on an output signal path 129.

A direction code generator 130 receives the distance code from the distance code generator 122 on the signal path 124 and receives the new and the last signpost codes from the new and the last signpost registers 112 and 114, respectively, on the signal paths 128 and 131, respectively. In response to receiving the new and the last signpost codes and the distance code, the direction code generator 130 generates a direction code indicating the direction of the vehicle or vehicle unit 14 from the signpost unit identified via the reference signpost code, and the direction code is provided via the direction code generator 130 on an output signal path 132. The direction code generator 130 compares the first portions and compares the last portions of the new and the last signpost codes and generates the direction code in response to these comparisons and in response to the distance code which indicates the selected reference signpost code. Further, if neither the first portions of the new and the last signpost codes nor the last portions of the first and the last signpost codes is identical, the direction code generator 130 provides an output signal indicating that the new and the last signpost codes are not chaining, this output signal being utilized by the vehicle unit 14 for inhibiting the generation of vehicle location code. In other words, a vehicle location code is generated by the vehicle unit 14 only in response to comparisons indicating that at least one of the first and the last portions of the new and the last signpost codes are identical. For example, if signpost codes are received from the signpost units 12L and 12M, the signpost codes being respectively (10, 22) and (14, 22), the last portions of the two signpost codes (10, 22) and (14, 22) are identical and the signpost units 12L and 12M are determined to be chaining. On the other hand, if signpost codes are received from the signpost units 12L and 12I, the signpost codes being respectively (10, 22) and (12, 24), neither the first nor the last portions are identical and the signpost units 12L and 12I are determined to be non-chaining, thereby resulting in the inhibiting of the generation of a vehicle location in response to these two received signpost unit output signals.

The unique signpost unit 12 coding system permits the direction of the vehicle or vehicle unit 14 from the signpost unit 12 identified via the reference signpost code. If a comparison of the first portions of the new and the last signpost codes indicates that the first portions are increasing and a comparison indicates that the last portions are identical, the direction code generator 130 generates a direction code indicating the vehicle or vehicle unit 14 is located in a region in the first direction 56 from the signpost unit 12 identified via the reference signpost code, since the first portion of the signpost code increases in the first direction 56. On the other hand, if the compared first portions are decreasing and the compared last portions are identical, the direction codes indicates the vehicle or vehicle unit 14 to be located in a region in a direction opposite the first direction 56 from the signpost unit 12 identified via the reference signpost code. If the compared first portions are identical and the compared last portions are increasing, the direction codes indicate the vehicle or vehicle unit 14 to be located in a region in the second direction 60 from the signpost unit 12 identified via the reference signpost code, since the last portion of the signpost codes increases in the second direction 60. If the compared first portions are identical and the compared last portions are decreasing, the direction code indicates the vehicle or vehicle unit 14 to be located in a region in a direction opposite the second direction 60 from the signpost unit 12 identified via the reference signpost code. In making the above comparisons, the direction code generator 130 compares the first and last portions of the reference signpost code (the new or last signpost code as indicated as determined from the distance code) with the other of the new and the last signpost codes.

A vehicle location code register 134 receives the reference signpost code from the reference signpost selector 126 on the signal path 129, the direction code from the direction code generator 130 on the signal path 132 and the distance code from the distance code generator 122 on the signal path 124. The vehicle location register 134 has a vehicle code encoded therein which uniquely identifies a particular vehicle unit 14, thereby uniquely identifying a particular vehicle 16. The vehicle location code register 134 generates or has encoded therein a vehicle location code comprising the vehicle code, the reference signpost code and a region code wherein the region code comprises the direction code and the distance code. Thus, the vehicle location code register 134 has encoded therein a vehicle location code which uniquely identifies a particular vehicle and the location of the particular vehicle within the monitored area. The vehicle location code register provides the vehicle location code via an output signal on a signal path 136 for transmission via the vehicle unit 14 to the base station 18.

When a vehicle or vehicle unit 14 is located within the near-field region of a particular signpost unit 12, the vehicle unit 14 will be receiving repetitively signpost unit 12 output signals from only one signpost unit 12 and the power level of the signpost unit 12 output signals will be greater than or equal to the power level ($P_1$). Thus, in the near-field region, the new signpost code and the last signpost code entered into the new signpost register 112 and the last signpost register 114, respectively, will be identical and the distance code provided via the distance code generator 122 will indicate that the signpost unit output signals encoded with the new signpost code and the last signpost code were each received at a power level equal to or greater than the power level ($P_1$), the distance code thereby indicating the vehicle or vehicle unit 14 to be located within the near-field region. The identical new and last signpost codes are entered into the signpost selector 126 via the signal paths 128 and 131 and the distance code is entered into the signpost 126 from the distance code generator 122. Since the new and the last signpost codes are identical, the reference signpost selector 126 could select either the new or the last signpost code as the reference signpost code; however, in one embodiment, the reference signpost selector 126 is constructed to select the last signpost code as the reference signpost code in response to a distance code indicating that the vehicle or vehicle unit 14 is located in a near-field region (this choice being dictated to a large extent on the particular logic system selected). Thus, the reference signpost code corresponding to the last signpost code is entered into the vehicle location register 134 via the signal path 129. The new and the last signpost codes are each entered into the direction code generator 130 via the signal paths 128 and 131 and the distance code is entered into the direction code generator 130 via the signal path 124. When the vehicle or vehicle unit 14 is located within the near-field region, the new and the last signpost codes will be identical and the comparisons of the first and the last portions of the new and the last signpost codes will indicate that the first portions are identical and that the last portions are identical. This information combined with the distance code permits the direction code generator 130 to generate a direction code indicating that the vehicle or vehicle unit 14 is located at the signpost unit identified via the reference signpost code (the last signpost code) and this distance code is entered into the vehicle location code register 134 via the signal path 132. When the vehicle unit is in the near-field region of one of the signpost units 12, the distance code indicating the location of the vehicle 16 within the near-field region of one of the signpost units 12 will be entered into the vehicle location code register 134 via the signal path 124. Thus, when the vehicle or vehicle unit 14 is located within the near-field region of one of the signpost units 12, the vehicle location code entered into the vehicle location code register 134 will include the vehicle code, the reference signpost code (corresponding to the last signpost code), the direction code indicating the vehicle or vehicle unit 14 to be located at the signpost unit 12 identified via the reference signpost code (the last signpost code) and the distance code indicating the vehicle or vehicle unit 14 to be located within a near-field region. The vehicle location code identifies the vehicle 16 via the vehicle code and identifies the location of the vehicle 16 within the monitored area to be at the signpost unit 12 identified via the reference signpost code (the last signpost code) in the vehicle location code register 134.

When the vehicle or vehicle unit 14 is located within one of the overlap regions, the vehicle unit 14 will alternately receive an output signal from the two different signpost units 12 which cooperate to form the particular overlap region, and each of the received signpost unit 12 output signals will be received by the vehicle unit 14 at a power level greater than or equal to the power level ($P_2$) but less than the power level ($P_1$). In the overlap region, one of the signpost codes from one of the signpost units 12 forming the particular overlap region will be entered into the last signpost register 114 and the signpost code of the other signpost unit 12 forming the particular overlap region will be entered into the new signpost register 112. The signpost codes in the new and the last signpost registers 112 and 114 will alternate when the vehicle or vehicle unit 14 is in one of the overlap regions. Further, the power levels entered into the distance code generator 122 will indicate that the new signpost code and the last signpost code were each received via a signpost unit 12 output signal at a power level greater than or equal to the power level ($P_2$) but less than the power level ($P_1$), the distance code generator 22 generating a distance code indicating the vehicle or vehicle unit 14 is located within one of the overlap regions in response to receiving power level signals from the power level detector 108 indicating that the signpost unit 12 output signals encoded with the new and the last signpost codes were each received at a power level greater than or equal to the power level ($P_2$) but less than the power level ($P_1$).

In the overlap region, the new and the last signpost codes in the new and the last signpost registers 112 and 114, respectively, are each entered into the reference signpost selector 126 and into the direction code generator 130. Further, the distance code indicating the vehicle or vehicle unit 14 to be located within one of the overlap regions also is entered into the reference signpost selector 126 and the direction code generator 130. In the overlap region, the reference signpost selector 126 is constructed to select the new signpost code as the reference signpost code (this choice dictated to a large extent on the particular logic system) and this selected, reference signpost code is entered into the vehicle location code register 134 via the signal path 129.

In the overlap region, the direction code generator 130 generates a direction code indicating the direction of the vehicle or vehicle unit 14 from the signpost unit 12 identified via the reference signpost code (the new signpost code). Since the vehicle unit 14 will alternately receive output signals from the two signpost units 12 forming the particular overlap region, the reference signpost selector 126 will alternately select one and then the other of the two signpost units 12 forming the particular overlap region and the direction code generator 130 will alternately provide a direction code: one direction code indicating the direction of the vehicle or vehicle unit 14 from one of the signpost units 12 forming the overlap region and one direction code indicating the direction of the vehicle or vehicle unit 14 from the other signpost unit 12 forming the overlap region.

Thus, in the overlap region, the vehicle location code in the vehicle location code register 134 will alternately indicate that a particular vehicle or vehicle unit 14 identified via the vehicle code is located within an overlap region (indicated by the distance code) in one direction (indicated by the direction code) from one of the signpost units 12 forming the overlap region identified via the selected reference signpost code and, alternately, indicate that the particular vehicle or vehicle unit 14 (identified via the vehicle code) is located within an overlap region (identified via the distance code) in the opposite direction (identified via the direction code) from the signpost unit 12 identified via the reference signpost code (the signpost code identifying the other signpost unit 12 forming the overlap region).

When a vehicle or vehicle unit 14 is located within one of the transition regions of the monitored area, the vehicle unit 14 will alternately receive output signals from the two signpost units 12 forming the particular transition region; however, one of the signpost unit 12 output signals forming the transition region will be received via the vehicle unit 14 at a power level greater than or equal to the power level ($P_1$) and the signpost unit 12 output signal from the other signpost unit 12 forming the particular transition region will be received via the vehicle unit 14 at a power level greater than or equal to the power level ($P_2$) but less than the power level ($P_1$). Further, in the transition region, the signpost codes identifying the signpost units 12 forming the transition region will alternately be entered into the new and the last signpost registers 112 and 114; that is, the signpost code identifying one of the signpost units 12 forming the transition region will alternately be entered into the new signpost register 112 and the signpost code identifying the other signpost unit 12 forming the particular transition region will alternately be entered into the last signpost register 114.

Since the power levels of the signpost unit 12 output signals encoded with the new and the last signpost codes are different in a transition region, the distance code generator 122 will provide a distance code on the signal path 124 indicating that the two signpost unit 12 output signals encoded with the new and the last signpost codes were received via the vehicle unit 14 at different power levels or within different power level ranges, thereby indicating the vehicle or vehicle unit 14 to be located within a transition region. When the vehicle or vehicle unit 14 is located in one of the transition regions, the reference signpost selector 126 is constructed to select as the reference signpost code the signpost code identifying the signpost unit 12 which is located the nearest to the particular vehicle or veicle unit 14. Thus, in one of the transition regions, the reference signpost selector 126 selects as the reference signpost code the new or the last signpost code whichever was received via an output signal at a higher power level as indicated via the distance code.

In one of the transition regions, the direction code generator compares the first and the last portions, respectively, of the new and the last signpost codes and generates the direction code indicating the direction of the vehicle or vehicle unit 14 from the signpost unit 12 identified via the reference signpost code (the signpost unit 12 which is nearest the vehicle unit 14).

For example, assume the vehicle unit 14 is located in the near-field region 64 of the signpost unit 12A (shown in FIG. 2). In this instance, the vehicle unit 14 will be repetitively receiving the signpost unit 12A output signals encoded with the signpost code (8, 28) identifying the signpost unit 12A and the power level such signpost unit 12A output signals received via the vehicle unit 14 will be greater than or equal to the power level ($P_1$). Since the signpost unit 12A output signals are repetitively received, the signpost code (8, 28) identifying the signpost unit 12A will be entered into the new and the last signpost registers 112 and 114. Based on the power level signals received from the power level detector 108, the distance code generator 122 will generate and provide the distance code on the signal path 124 indicating the signals received via the vehicle unit 14 associated with the new signpost code and the last signpost code were each at a power level greater than or equal to the power level ($P_1$), thereby indicating the location of the vehicle unit 14 within a near-field region. The distance code is entered into the vehicle location code register 134 and into the reference signpost selector 126 and the direction code generator 130.

Since distance code indicates the vehicle unit 14 to be located within a near-field region, the reference signpost selector 126 will select the last signpost code (8, 28) as the reference signpost code, although either the new or the last signpost code could be selected in this instance since the new and the last signpost codes are identical. The selected, reference signpost code (8, 28) is provided on the signal path 129 via the reference signpost selector 126 and entered into the vehicle location code register 134.

The new and the last signpost codes also are each entered into the direction code generator 130. The direction code generator 130 compares separately the first portions and the last portions of the new and the last signpost codes. When the vehicle unit 14 is located within a near-field region as indicated via the distance code, the first portions of the new and the last signpost codes will be identical and the last portions of the new and the last signpost codes will be identical, since the new and the last signpost codes are identical. Thus, the direction code generator 130 will generate and provide on the signal path 132 a direction code indicating the vehicle or vehicle unit 14 is located at the signpost 12A, the direction code on the signal path 132 being entered into the vehicle location code register 134.

Thus, when the vehicle unit 14 is located in the near-field region 64 of the signpost unit 12A, the vehicle location code in the vehicle location code register 134 comprises the vehicle code, the reference signpost code (8, 28), the direction code indicating the vehicle or vehicle unit 14 to be located at the signpost unit 12A (the signpost unit identified via the reference signpost code) and the distance code indicating the vehicle or vehicle unit 14 to be located in the near-field region of the reference signpost code (8, 28) or, in other words, indicating the vehicle or vehicle unit 14 to be located in the near-field region 64 of the signpost unit 12A since the reference signpost code (8, 28) is identical with or corresponds to the signpost code (8, 28) identifying the signpost unit 12A.

By the same token, when the vehicle or vehicle unit 14 is located in the near-field region 72 of the signpost unit 12H, the vehicle unit 14 will receive consecutively output signals from the signpost unit 12H encoded with the signpost unit 12H signpost code (8, 24). In a manner similar to that described before with respect to the near-field region 64 of the signpost unit 12A, the signpost code (8, 24) of the signpost unit 12H will be in the new signpost register 112 and the last signpost register 114, and the distance code generator 122 will generate and provide a distance code indicating that the signpost unit 12H output signals were each received at a power level greater than or equal to the power level ($P_1$), thereby indicating the vehicle or vehicle unit 14 to be located within a near-field region. The reference signpost selector 126 will select the last signpost code (8, 24) as the reference signpost code and the reference signpost code (8, 24) will be entered into the vehicle location register 134 via the signal path 129. The direction code generator 130 will generate a direction code indicating the vehicle or vehicle unit 14 to be located at a signpost unit, the direction code being entered into the vehicle location code register 134 via the signal path 132. Thus, when the vehicle or vehicle unit 14 is located in the near-field region 72 of the signpost unit 12H, the vehicle location code in the vehicle location register 134 will comprise the vehicle code identifying the particular vehicle or vehicle unit 14, a reference signpost code (8, 24) indentifying the signpost unit 12H, a direction code identifying the vehicle or vehicle unit 14 to be located at the signpost 12H identified via the reference signpost code (8, 24) and a distance code indicating the vehicle or vehicle unit 14 to be located in a near-field region [the near-field region 64 of the signpost unit 12H identified via the signpost reference code (8, 24)].

When the vehicle or vehicle unit 14 is located in the transition region 82, the vehicle unit 14 will alternately receive the output signals provided by the signpost units 12A and 12H; however, the signpost unit 12A output signal will be received at a power level equal to or greater than the power level ($P_1$) and the signpost unit 12H output signal will be received at a power level greater than or equal to the power level ($P_2$) but less than the power level ($P_1$).

Assuming the signpost unit 12A output signal is first received via the vehicle unit 14 while located in the transition region 82, then, the signpost unit 12A signpost code (8, 28) will be entered into the new signpost register 112 and the power level detector 108 output signal on the signal path 118 will indicate that the signpost unit 12A output signal was received at a power level greater than or equal to the power level ($P_1$), this power level signal being entered into the distance code generator 122. Next the vehicle or vehicle unit 14 would receive the signpost unit 12H output signal and the signpost code (8, 24) identifying the signpost unit 12H would be entered into the new signpost register 112, the signpost code (8, 28) identifying the signpost unit 12A being shifted from the new signpost register 112 to the last signpost register 114. The power level detector 108 would provide a power level signal on the signal path 118 indicating that the signpost unit 12H output signal was received at a power level greater than or equal to the power level ($P_2$) but less than the power level ($P_1$), this power level signal being entered into the distance code generator 112. In this condition, the signpost unit 12H signpost code (8, 24) would be in the new signpost register 112 and the signpost unit 12A signpost code (8, 28) would be in the last signpost register 114. Further, the distance code generator would generate and provide on the signal path 124 a distance code indicating that the last signpost code (8, 28) was received at a power level greater than or equal to the power level ($P_1$) and the new signpost code (8, 24) was received at a power level greater than or equal to the power level ($P_2$) but less than the power level ($P_1$), thereby indicating that the vehicle or vehicle unit 14 is located within a transition region. This distance code is entered into the reference signpost selector 126, the direction code generator 130 and the vehicle location code register 134. The new signpost code (8, 24) and the last signpost code (8, 28), would each be entered into the reference signpost selector 126 and into the direction code generator 130. In response to receiving a distance code indicating that the vehicle or vehicle unit 14 is located within a transition region, the reference signpost selector 126 would select the signpost code identifying the signpost unit which is the nearest to the vehicle or, in other words, would select as the reference signpost code the signpost code identifying the signpost unit output signal which was received at the greatest power level; that is, which was received at a power level greater than or equal to the power level ($P_1$). In this example, the reference signpost selector 126 would select as the reference signpost code the last signpost code (8, 28) and this reference signpost code (8, 28) would be entered into the vehicle location register 134 via the signal path 129.

The direction code generator 130 compares the first portions of the new and the last signpost codes and compares the last portions of the new and the last signpost codes. As indicated via the distance code, the vehicle or vehicle unit 14 is in a transition region and the last signpost code (8, 28) has been selected as the reference signpost code. The direction code generator 130 will compare the first portions of the new and the last signpost codes and, in this instance, the first portions are identical thereby providing the determination that the new and the last signpost codes are chaining. The direction code generator 130 will compare the last portions of the new and the last signpost codes and, more particularly, will make the comparison with respect to the new or the last signpost code whichever has been selected as the reference signpost code. In this example, the comparison of the last portions of the new and the last signpost codes indicates that the last portions are decreasing (28 being greater than 24) and the decreasing order of the last portions of the new and the last signpost codes determines the direction code to be generated via the direction code generator 130, the direction code generator 130 generating a direction code indicating that the vehicle unit 14 is in a direction opposite the second direction 60 from the signpost unit 12A identified via the reference signpost code, and this direction code is entered into the vehicle location code register 134 via signal path 132.

Thus, when the vehicle unit 14 is in the transition region 82, the vehicle location code in the vehicle location code register 134 comprises the vehicle code identifying the particular vehicle or vehicle unit 14, the reference signpost code (8, 28) identifying the signpost unit 12A, a direction code indicating the transition region is located in a direction, opposite the direction 60, from the signpost unit 12A identified via the reference signpost code (8, 28) and a distance code indicating that the vehicle or vehicle unit 14 is located in a transition region, this vehicle location code thereby identifying the particular vehicle or vehicle unit 14 as being located in the transition region 82.

When the vehicle or vehicle unit 14 is located in the transition region 78, the vehicle unit 14 will alternately receive the output signals provided by the signpost units 12A and 12H; however, the signpost unit 12H output signal will be received at a power level equal to or greater than the power level ($P_1$) and the signpost unit 12A output signal will be received at a power level greater than or equal to the power level ($P_2$) but less than the power level ($P_1$). Assuming the signpost unit 12A output signal is received first via the vehicle unit 14, then the signpost unit 12H signpost code (8, 24) would be in the new signpost register 112 and the signpost unit 12A signpost code (8, 24) would be in the last signpost register 114, in a manner similar to that described before with respect to the transition region 82. The distance code provided via the distance code generator 122 would indicate that the new signpost code (8, 24) was received at a power level greater than or equal to the power level ($P_1$) and the last signpost code (8, 28) was received at a power level greater than or equal to the power level ($P_2$) but less than the power level ($P_1$), thereby indicating the vehicle unit 14 is located within a transition region. The reference signpost selector 126 would select as the reference signpost code the signpost code identifying the nearest signpost unit or, in other words, the reference signpost selector 126 would select as the reference signpost code the new signpost code (8, 24) and this reference signpost code (8, 24) would be entered into the vehicle location register 134 via the signal path 129.

In the last mentioned example and in the transition region 78, the direction code generator 130 determines the new and the last signpost codes are chaining since the first portions of the new and the last signpost codes are identical. The last portions of the new and the last signpost codes are compared via the direction code generator 122 and, in this example, the last portions are increasing (28 being greater than 24). The increasing order of the last portions of the new and the last signpost codes determines the direction code to be generated via the direction code generator 130, the direction code indicating the vehicle unit 14 is in the first direction 60 from the signpost unit 12H identified via the reference signpost code. Thus, in this instance, the vehicle location code comprises the vehicle code, the reference signpost code (8, 24) identifying the signpost unit 12H, a direction code indicating the vehicle unit 14 is located in the second direction 60 from the signpost unit 12H identified via the reference signpost code (8, 24) and a distance code indicating that the vehicle or vehicle unit 14 is located in a transition region, this vehicle location code identifying the particular vehicle unit 14 as being located in the transition region 78.

When the vehicle unit 14 is located in the overlap region 80, the vehicle unit 14 will receive in an alternating fashion the output signals of the signpost units 12A and 12H and each of the output signals will be at a power level greater than or equal to the power level ($P_2$) but less than the power level ($P_1$). Assuming the signpost unit 12A output signal is received first followed by the signpost unit 12A, then, the signpost unit 12H signpost code (8, 24) will be in the new signpost register 112 and the signpost unit 12A signpost code (8, 28) will be in the last signpost register 114. The distance code will indicate that the vehicle unit 14 is located in an overlap region since the new and the last signpost codes each were received at a power level greater than or equal to the power level ($P_2$) but less than the power level ($P_1$). In the overlap region, the reference signpost selector 126 will select as the reference signpost code the new signpost code (8, 24). The direction code generator 130 will determine that the signpost codes are chaining since the first portions of the new and the last signpost codes (8, 24) and (8, 28), respectively, are identical. The direction code generator 130 will compare the last portion of the last signpost code (8, 28) with the last portion of the reference signpost code (8, 24) and this comparison indicates that the compared last portions are increasing, the generated direction code indicating that the vehicle unit 14 is located in the second direction 60 from the signpost unit identified via the reference signpost code (8, 24); that is, the new signpost code (8, 24) corresponding to or identifying the signpost unit 12H. In this example, the vehicle location code comprises the vehicle code, the reference signpost code (8, 24) identifying the signpost unit 12H, the direction code indicating that the vehicle unit 14 is located in the second direction 60 from the signpost unit 12H identified via the reference signpost code (8, 24), and the distance code indicating the vehicle unit 14 is located in an overlap region. Thus, this vehicle location code identifies the vehicle unit 14 as being located in the overlap region 80.

When the vehicle unit 14 is located in the overlap region 80 and assuming the output signals from the signpost units 12H and 12A are received in a reverse order as compared with the last-mentioned example, then, the reference signpost code would be the new signpost code (8, 28) which identifies the signpost unit 12A, the direction code would indicate that the last portions of the compared new and last signpost codes (8, 28) and (8, 24) are decreasing thereby indicating the region the vehicle unit 14 is located in a direction opposite the second direction 60 from the signpost unit 12A identified via the reference signpost code (8, 28), and the distance code indicates that the vehicle unit 14 is located within an overlap region. In this instance, the vehicle location code still identified the particular overlap region 80.

Changes may be made in the various components and assemblies and in the steps of the method described herein without departing from the spirit and the scope of the invention as defined in the claims.

What is claimed is:

1. A method for monitoring the location of monitored objects within a monitored area, comprising the steps of:

positioning signpost units within the monitored area, each signpost unit being positioned at the intersection of a first coordinate grid line and a second coordinate grid line with the first coordinate grid lines being spaced generally in a first direction and extending generally in a second direction and with the second coordinate grid lines being spaced generally in the second direction and extending generally in the first direction, the first coordinate grid lines being assigned numbers sequentially increasing in the first direction and the second coordinate grid lines being assigned numbers sequentially increasing in the second direction, each signpost unit having a signpost code encoded therein uniquely identifying the signpost unit and having a first portion corresponding to the number assigned to the first coordinate grid line and a second portion corresponding to the number assigned to the second coordinate grid line of the intersecting first and second coordinate grid lines defining the position of the signpost unit;

transmitting the signpost codes via the signpost units;

receiving the signpost codes at the monitored objects, each received signpost code being a new signpost code and the signpost code received prior to the new signpost code being the last signpost code; and determining at the monitored object the location of the monitored object within the monitored area, comprising the steps of:

selecting one of the new signpost code and the last received signpost code as a reference signpost code;

comparing the first portion of the new signpost code with the first portion of the last signpost code and comparing the second portion of the new signpost code with the second portion of the last signpost code;

determining the monitored object to be located at the signpost unit identified via the reference signpost code in response to a comparison indicating the first and the last portions of the new signpost code and the last received signpost code are the same; and determining the direction of the monitored object from the signpost unit identified via the reference signpost code in response to a comparison indicating a difference between any one of the comparisons of the first and last portions of the new signpost code and the last received signpost code.

2. The method of claim 1 wherein the step of transmitting the signpost codes via the signpost units is defined further as transmitting each signpost code via an output signal establishing a near-field region extending a distance from the signpost unit and a far-field region extending a distance from the signpost unit greater than the distance of the near-field region from the signpost unit, the signpost unit output signal having a power level at least equal to a predetermined power level ($P_1$) within the near-field region and the signpost unit output signal having a power level at least equal to a predetermined power level ($P_2$) within the far-field region; and wherein the step of positioning the signpost units within the monitored area is defined further as positioning the signpost units such that the far-field region established via the output signal of each signpost unit overlaps a portion of the near-field region established via the output signal of at least one other signpost unit thereby forming a transition region and such that the far-field region established via the output signal of each signpost unit overlaps a portion of the far-field region established via the output signal of at least one other signpost unit thereby forming an overlap region; and wherein the step of determining the location of the monitored object is defined further to include the step of:

determining the power level of the signpost unit output signals received via the monitored object, and determining the location of the monitored object only in response to received signpost unit output signals having a power level at least equal to the predetermined power level ($P_2$).

3. The method of claim 2 wherein the step of determining the power level of the output signals received via the monitored object is defined further to include the steps of:

determining the power level of the signpost unit output signal encoded with the new signpost code;

determining the power level of the signpost unit output signal encoded with the last signpost code; and generating a distance code indicating the monitored object to be located in a transition region in response to a determination indicating the power level of one of the output signals encoded with one of the new signpost code and the last received signpost code to be at least equal to the power level ($P_2$) but less than the power level ($P_1$) and the power level of the other one of the output signals encoded with one of the new signpost code and the last signpost code to be at least equal to the power level ($P_1$), and indicating the monitored object to be located in an overlap region in response to a determination indicating the power levels of each of the output signals encoded with the new signpost code and the last received signpost code to be at least equal to the power level ($P_2$) but less than the power level ($P_1$).

4. The method of claim 3 wherein the step of generating the distance code is defined further as indicating the monitored object to be located within a near-field region in response to a determination indicating the power levels of each of the output signals encoded with the new signpost code and the last signpost code are each at least equal to the power level ($P_1$).

5. The method of claim 4 wherein the step of selecting the reference signpost code is defined further as selecting the new signpost code as the reference signpost code in response to a direction code indicating the location of the monitored object in an overlap region, and selecting the last signpost code as the reference signpost code in response to a direction code indicating the location of the monitored object in a near-field region, and selecting one of the new signpost code and the last received signpost code as the reference code in response to a direction code indicating the location of the monitored object in a transition region.

6. The method of claim 4 wherein the step of determining the direction of the monitored object from the signpost unit identified via the reference signpost code is defined further to include the step of:

generating a direction code in response to a comparison indicating the first portion of the new signpost code to be the same as the first portion of the last signpost code, and indicating the last portion of the new signpost code to be greater than the last portion of the last signpost code, and generating different direction code in response to a comparison indicating the first portion of the new signpost code to be the same as the first portion of the last signpost code and the last portion of the new signpost code to be less than the last portion of the last signpost code, and generating a different direction code in response to a comparison indicating the last portion of the new signpost code to be the same as the last portion of the last signpost code and indicating the first portion of the new signpost code to be greater than the first portion of the last signpost code, and generating a different direction code in response to a comparison indicating the last portion of the new signpost code to be the same as the last portion of the last signpost code and indicating the first portion of the new signpost code to be less than the first portion of the last received signpost code, the direction codes indicating the direction of the monitored object from the signpost unit identified via the selected reference signpost code.

7. The method of claim 4 wherein the step of determining the location of the monitored object is defined further to include the steps of:
 encoding a vehicle code in a vehicle unit located in each monitored object, each vehicle code uniquely identifying a particular vehicle; and
 generating a vehicle location code at the monitored object comprising the vehicle code, the direction code and the distance code, the vehicle code identifying the particular monitored object and the location of the monitored object within the monitored area.

8. The method of claim 7 defined further to include the step of:
 transmitting the vehicle identification code from the monitored object.

9. The method of claim 7 wherein each of the signpost codes, including the new signpost code, the last signpost code and the reference signpost code, each of the vehicle codes, each of the distance codes and each of the direction codes are electrical signals representing a predetermined binary number.

10. A method for monitoring the location of monitored objects within a monitored area wherein signpost units are positioned within the monitored area, each signpost unit being oriented with respect to a first direction and a second direction and wherein each signpost unit is encoded with a signpost code uniquely identifying the particular signpost unit, each signpost code comprising a first portion sequentially increasing a first direction and a second portion sequentially increasing in a second direction, the signpost codes being transmitted via the signpost units, comprising the steps of:
 receiving the signpost codes transmitted via the signpost units at the monitored objects, each received signpost code being a new signpost code and the signpost code received prior to the new signpost code being the last signpost code; and
 determining at the monitored object an indication of the location of the monitored object within the monitored area, comprising the steps of:
 comparing the first portion of the new signpost code with the first portion of the last received signpost code and comparing the second portion of the new signpost code with the last portion of the last signpost code; and
 determining the direction of the monitored object from the signpost unit identified via one of the first and last signpost codes in response to the comparisons of the first and last portions of the new signpost code and the last received signpost code.

11. The method of claim 10 wherein the step of transmitting the signpost codes via the signpost units is defined further as transmitting each signpost code via an output signal establishing a near-field region extending a distance from the signpost unit and a far-field region extending a distance from the signpost unit greater than the distance of the near-field region from the signpost unit, the signpost unit output signal having a power level at least equal to a predetermined power level ($P_1$) within the near-field region and the signpost unit output signal having a power level at least equal to a predetermined power level ($P_2$) within the far-field region; and wherein the step of positioning the signpost units within the monitored area is defined further as positioning the signpost units such that the far-field region established via the output signal of each signpost unit overlaps a portion of the near-field region established via the output signal of at least one other signpost unit thereby forming a transition region and such that the far-field region established via the output signal of each signpost unit overlaps a portion of the far-field region established via the output signal of at least one other signpost unit thereby forming an overlap region; and wherein the step of determining the location of the monitored object is defined further to include the step of:
 determining the power level of the signpost unit output signals received via the monitored object, and determining the location of the monitored object only in response to received signpost unit output signals having a power level at least equal to the predetermined power level ($P_2$).

* * * * *